United States Patent [19]

Yatka et al.

[11] Patent Number: 5,094,858
[45] Date of Patent: Mar. 10, 1992

[54] ALITAME STABILITY IN CHEWING GUM PRODUCTS USING ROLLING COMPOUNDS

[75] Inventors: Robert J. Yatka, Orland Park; Gordon N. McGrew, Evanston, both of Ill.

[73] Assignee: Wm Wrigley Jr. Company, Chicago, Ill.

[21] Appl. No.: 608,566

[22] Filed: Nov. 2, 1990

Related U.S. Application Data

[63] Continuation-in-part of Ser. No. 458,989, Dec. 29, 1989, Pat. No. 4,997,659.

[51] Int. Cl.$^5$ ............................................... A23G 3/30
[52] U.S. Cl. .................................. 426/5; 426/548; 426/804
[58] Field of Search ............................ 426/5, 548, 804

[56] References Cited

U.S. PATENT DOCUMENTS

| | | | |
|---|---|---|---|
| 2,305,960 | 12/1942 | Frorer | 426/5 |
| 4,127,677 | 11/1978 | Fronczkowski et al. | 426/5 |
| 4,139,639 | 2/1979 | Bahosky et al. | 426/3 |
| 4,230,687 | 10/1980 | Sair et al. | 426/548 |
| 4,374,858 | 2/1983 | Glass | 426/5 |
| 4,384,004 | 5/1983 | Cea et al. | 426/5 |
| 4,386,106 | 5/1983 | Merritt et al. | 426/5 |
| 4,411,925 | 10/1983 | Brennan et al. | 426/548 |
| 4,515,769 | 5/1985 | Merritt et al. | 426/96 |
| 4,517,379 | 5/1985 | Brennan et al. | 426/548 |
| 4,536,396 | 8/1985 | Stephens, Jr. et al. | 426/548 |
| 4,562,076 | 12/1985 | Arnold et al. | 426/5 |
| 4,597,970 | 7/1986 | Sharma et al. | 426/5 |
| 4,634,593 | 1/1987 | Stroz et al. | 426/5 |
| 4,988,518 | 1/1991 | Patel et al. | 426/5 |
| 4,997,659 | 3/1991 | Yatka et al. | 426/3 |

FOREIGN PATENT DOCUMENTS

| | | |
|---|---|---|
| 0027024 | 4/1981 | European Pat. Off. . |
| 0160607 | 11/1985 | European Pat. Off. . |
| 0354680 | 2/1990 | European Pat. Off. . |
| WO89/07895 | 9/1989 | PCT Int'l Appl. . |
| WO90/06061 | 6/1990 | PCT Int'l Appl. . |
| WO90/11018 | 10/1990 | PCT Int'l Appl. . |
| WO90/11019 | 10/1990 | PCT Int'l Appl. . |
| WO90/11020 | 10/1990 | PCT Int'l Appl. . |
| WO90/11021 | 10/1990 | PCT Int'l Appl. . |

OTHER PUBLICATIONS

"Alitame-A New High Intensity Sweetener Technological Summary-1987" brochure by Pfizer.

*Primary Examiner*—Jeanette Hunter
*Attorney, Agent, or Firm*—Willian Brinks Olds Hofer Gilson & Lione

[57] ABSTRACT

Chewing gum products incorporating Alitame in the manner to separate the Alitame from gum ingredients which cause the Alitame to degrade are disclosed. The product comprises a chewing gum composition with a rolling compound applied thereto. The rolling compound comprises about 0.01% to about 20% Alitame. Preferably the rolling compound is substantially free of Alitame degradation ingredients, such as alditols.

19 Claims, 1 Drawing Sheet

ALITAME STABILITY IN CHEWING GUM PRODUCTS USING ROLLING COMPOUNDS

CROSS REFERENCE TO RELATED APPLICATION

This application is a continuation-in-part of application Ser. No. PCT/US89/01269, filed Mar. 28, 1989, and a continuation-in-part of application Ser. No. 07/458,989 filed Dec. 29, 1989, now U.S. Pat. No. 4,997,659, both of which are incorporated herein by reference.

BACKGROUND OF THE INVENTION

The present invention relates to chewing gum products and methods for producing chewing gum products. More particularly the invention relates to producing chewing gum products containing Alitame.

Alitame is a high-potency sweetener with a chemical composition of (L-α-Aspartyl-N-(2,2,4,4-tetramethyl-3-thietanyl)-D-alaninamide hydrate. This sweetener, which is not yet approved for use in food products and chewing gum, is being considered by the FDA as a food additive. The manufacturer of Alitame is the Pfizer Corporation of Groton, Conn.

Alitame has been used in chewing gum. Such use has been disclosed in several patents. U.S. Pat. No. 4,411,925 discloses simple addition of Alitame in gum. U.S. Pat. No. 4,536,396 discloses combinations of Alitame and Acesulfame K in foods including chewing gum.

Alitame has been found to be relatively unstable and susceptible to degradation in chewing gums containing certain ingredients. This result was rather unexpected since Alitame has been shown to be much more stable in aqueous solutions than aspartame, another dipeptide high-potency sweetener, and therefore, was expected to be much more stable in chewing gums.

Efforts have been directed at perfecting the use of other high-potency sweeteners within the chewing gum formulation, to thereby increase the shelf-life stability of the ingredients, i.e. the protection against degradation of the high-potency sweetener over time.

U.S. Pat. No. 4,139,639 to Bahoshy et al. teaches a process of "fixing" aspartame by co-drying (by spray drying or fluid-bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf-stability of the aspartame.

Efforts have also been devoted to controlling release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid undesirable overpowering burst of sweetness or flavor during the initial chewing period. On the other hand, some ingredients have been treated so as to increase their rate of release in chewing gum.

Some patents disclose how a sweetener like aspartame can be physically modified to control the release rate in chewing gum. For example, U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25° C. and 100° C. The method disclosed uses a spray-congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground and the particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,634,593 to Stroz et al. teaches a method for producing controlled release sweeteners for confections, such as chewing gum. The method taught therein involves the use of an insoluble fat material which is mix mulled with the sweetener.

Other patents suggest using sweeteners in rolling compounds. EPO Publication No. 0 027 024 and U.S. Pat. No. 4,374,858 discloses the use of aspartame, either free or encapsulated, in a rolling compound. EPO Publication No. 0 160 607 discloses an aspartame suspension added to a gum surface. PCT Publication WO 89/07895 discloses the use of xylitol as a rolling compound. U.S. Pat. No. 4,562,076 discloses the use of thaumatin in a rolling compound to enhance flavor and sweetness.

In light of the problem that Alitame degrades in the presence of some chewing gum ingredients, there presently exists a need to prevent this degradation. None of the prior art indicated specifically addresses a means to delay the degradation of Alitame in chewing gum. Thus a means to delay the degradation of Alitame would be highly desired.

SUMMARY OF THE INVENTION

The present invention includes chewing gum products and methods of making chewing gum products with Alitame. The chewing gum product of the present invention comprises a chewing gum composition comprising gum base from about 5 to about 95% of the chewing gum composition, a bulking agent from about 10 to about 90% of the chewing gum composition, and a flavoring agent from about 0.1 to about 10% of the chewing gum composition; and Alitame incorporated in a rolling compound applied to the gum composition, the rolling compound comprising from about 0.01% to about 20% Alitame. In preferred embodiments of the invention, the rolling compound is essentially free of ingredients, such as mannitol and sorbitol, that cause Alitame degradation.

An advantage of this invention is that Alitame's instability in chewing gum can be controlled by separating the Alitame from the substances capable of degrading it.

The present invention, together with the attendant objects and advantages, will be best understood with reference to the detailed description below.

DETAILED DESCRIPTION OF THE DRAWING AND PREFERRED EMBODIMENTS

Figure 1:
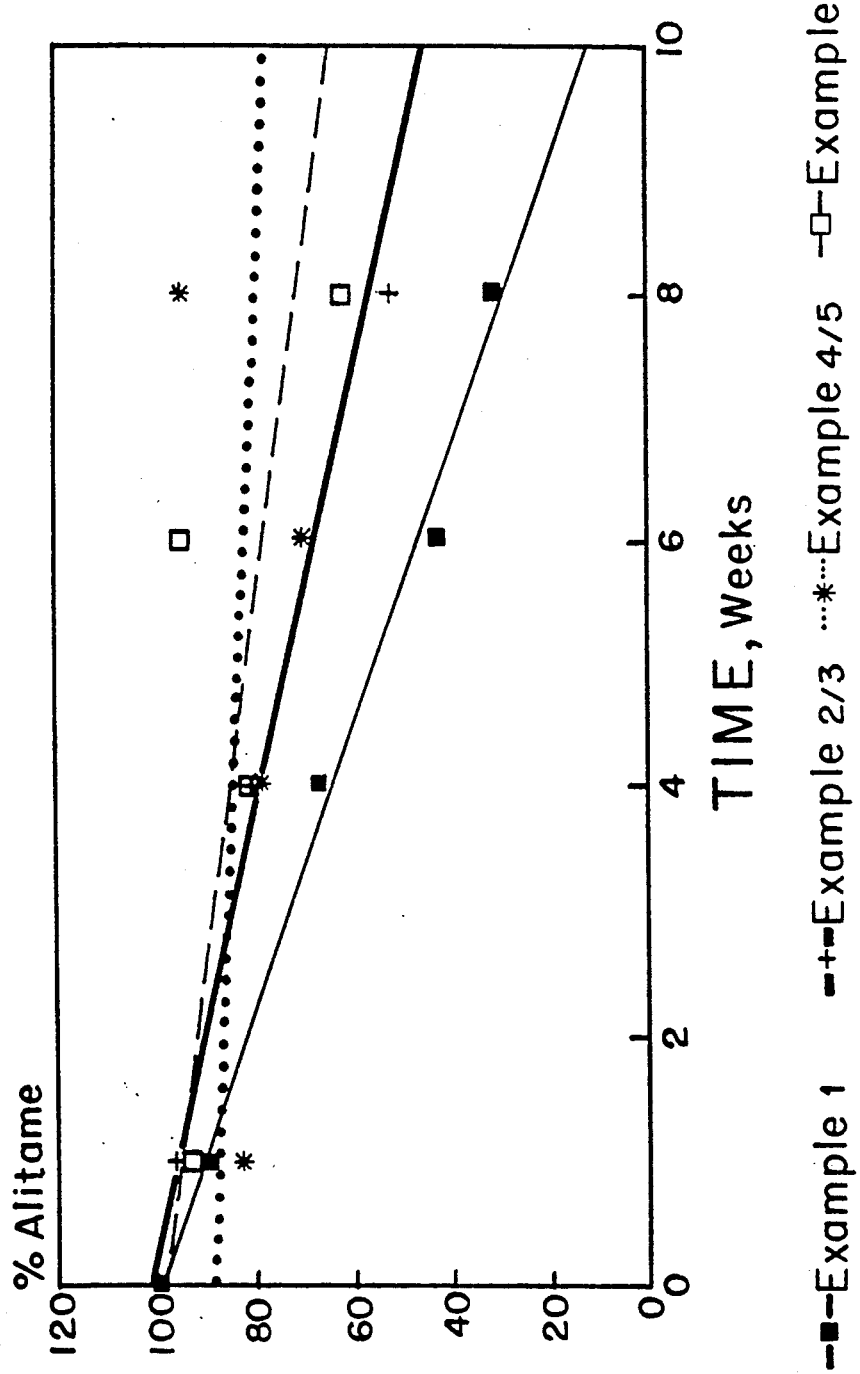
FIG. 1 is a graph depicting the results of Alitame degradation in chewing gum using the present invention.

In sugarless gums, a high-potency sweetener is usually used with a sugar alcohol. The sugar alcohol provides some sweetness, but is predominantly used as a bulking agent. Suitable sugar alcohols for sugarless gums include sorbitol, mannitol, xylitol, hydrogenated starch hydrolysates, maltitol, and the like, as well as combinations thereof. Early tests with sugarless gums containing Alitame showed unexpected Alitame degradation. It was theorized that the sugar alcohols used in the gum had an adverse effect upon Alitame. The results in Tests 1-5 discussed below confirmed this theory. It is also thought that some flavor ingredients, other alditols or some base ingredients may cause Alitame degradation.

One method of isolating Alitame sweetener from other chewing gum ingredients is to add Alitame to the rolling compound used on a chewing gum product. A rolling compound, sometimes called a dusting compound, is applied to the surface of chewing gum composition as it is formed into products. This rolling or dusting compound serves to reduce sticking of the composition to machinery as the product is formed, reduces sticking of the product to machinery as it is wrapped, and sticking of the product to its wrapper after it is wrapped and being stored. The rolling compound comprises Alitame sweetener in combination with sucrose, starch, calcium carbonate, talc, other orally acceptable substances or a combination thereof. The rolling compound constitutes from about 0.25% to about 10.0%, but preferably about 1% to about 3% of weight of the chewing gum product. The amount of Alitame sweetener added to the rolling compound is about 0.01% to about 20% of the rolling compound or about 1 ppm to about 2000 ppm of the chewing gum product. This method of using Alitame sweetener in the chewing gum can allow a lower usage level of the sweetener, can give the sweetener a more controlled release rate, and can reduce or eliminate any possible reaction of the sweetener with gum base, flavor components, or alditols, yielding improved shelf stability.

The preferred chewing gum formulation is a sugarless chewing gum. However, the Alitame rolling compound may also be used in sugar chewing gum to reduce or eliminate the degradation of Alitame due to the flavor in the gum. The Alitame rolling compound may be used in either regular chewing gum or bubble gum, both of which are referred to herein and in the claims by the term "chewing gum".

In general, a chewing gum composition typically comprises a water soluble bulk portion, a water-insoluble chewable gum base portion and typically water-insoluble flavoring agents. Additionally, the water soluble portion dissipates with a portion of the flavoring agent over a period of time during chewing, while the gum base is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates using any commercially acceptable base.

The water soluble portion of the chewing gum comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

A flavoring agent may be present in the chewing gum in an amount within the range of from about 0.1 to about 10.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers, and pharmaceutical agents may be added to the chewing gum. Also, in addition to the Alitame in the rolling compound, Alitame or other high-intensity sweeteners may be formulated into the gum composition, and may preferably be encapsulated or coated as taught in application Ser. No. 07/458,989.

In general, chewing gum is manufactured by sequentially adding the various chewing gum ingredients to a commercially available mixer known in the art. Generally, the ingredients are mixed by first melting the gum base and adding it to the running mixer itself. Color or emulsifiers may also be added at this time, along with syrup and a portion of the bulking agent. Further portions of the bulking agent may then be added to the mixer. A flavoring agent is typically added with the final portion of the bulking agent. The entire mixing procedure typically takes from five to fifteen minutes, but longer mixing times may sometimes be required.

After the ingredients have been thoroughly mixed, the gum mass is discharged from the mixer and shaped into the desired form such as by rolling into sheets and cutting into sticks, extruding into chunks or casting into pellets. A rolling compound is typically used wherever the fresh gum composition contacts a machinery surface. The rolling compound may be applied to the surface of the gum composition in only one location, or in several locations. If the rolling compound is applied at several locations, it is preferred, though not necessary, to use the same composition at each location. For purposes of the present invention, if the rolling compound is applied at more than one location, and does not have the same composition at each location, the Alitame content of the rolling compound applied to the product will have a weighted average (based on the relative amounts of rolling compound applied at each location) of the Alitame content of the different rolling compounds.

In preliminary tests it was discovered that separation of Alitame from other gum ingredients could be accomplished by mixing Alitame with a rolling compound like mannitol. This separation improved the stability of Alitame slightly. Tests on sugarless chewing gum with Alitame preblended with mannitol at 2 levels and used as a rolling compound were evaluated in an 8-week shelf life test at 85° F. The results are shown in Table II below as Examples 2 and 3, with comparative Example 1 being a control where the Alitame was mixed into the gum.

Later, solution tests 1-5 (below) of alditols and Alitame showed that alditols degraded Alitame.

TESTS 1-6

Tests 1-4 and comparative Test 5 were carried out to see the effect of alditols (sugar alcohols and glycerol) found in sugarless gum upon Alitame. A 0.01% Alitame aqueous solution was divided equally into 5 portions. In Tests 1-3, different sugar alcohols were added to each of the first three portions in proportions of 5 parts sugar alcohol and 95 parts Alitame solution. In Test 4, a 75/25 blend of Lycasin/glycerol was added to the fourth portion in proportion of 5 parts alditol and 95 parts Alitame solution. In comparative Test 5, there was no addition of sugar alcohol. Next, each test was divided in half and each half adjusted to a pH of either 5 or 7. Each test was further divided in half again and one half was stored at room temperature while the second half was stored at 120° F. The Alitame stability results are indicated in the table below.

TABLE I

| | | Percent of Original Alitame Remaining After 12 Weeks | | | |
|---|---|---|---|---|---|
| | | 75° F. pH 5 | 75° F. pH 7 | 120° F. pH 5 | 120° F. pH 7 |
| Test 1 | 5% Glycerol | 100 | 64 | 69 | 0 |
| Test 2 | 5% Sorbitol | 100 | 100 | 75 | 0 |
| Test 3 | 5% Mannitol | 100 | 94 | 80 | 0 |
| Test 4 | 5% Lycasin/ Glycerol blend | 100 | 94 | 77 | 47 |
| Test 5 | — | 97 | 100 | 95 | 79 |

Analysis of the results showed that, unexpectedly, Alitame degraded at a much quicker rate in solutions of sugar alcohols and glycerol than solutions not containing any alditols, and that glycerol and low molecular weight sugar alcohols seemed to particularly cause alitame degradation.

In light of the results of Tests 1-5, it was concluded that mannitol was not a preferred ingredient in a rolling compound to use with Alitame to give good stability of Alitame. It was thereafter discovered that other materials like talc, which is magnesium silicate, calcium carbonate, starch, sugar, cellulose powder or similar orally acceptable substance could be used as a rolling compound with Alitame to both separate the Alitame from the gum ingredients which cause degradation and avoid degradation caused by alditols in the rolling compound itself.

Tests involving Examples 4-7, discussed below, showed that using Alitame with starch or talc increases the stability of Alitame in chewing gum to at least 60% remaining after 8 weeks storage.

EXAMPLE 1-7

All of the examples used the following formula, listed by weight percent of the gum composition, except as specifically noted.

| | % |
|---|---|
| Base | 25.5 |
| Lecithin | 0.2 |
| Sorbitol | 49.4 |
| Mannitol | 8.0 |
| Lycasin | 6.8 |
| Glycerol | 8.6 |
| Peppermint flavor | 1.46 |
| Alitame | 0.04 |
| | 100.00 |

COMPARATIVE EXAMPLE 1

The standard gum formulation containing 0.04% Alitame was hand sheeted with straight mannitol as a rolling compound.

EXAMPLES 2 AND 3

A gum formulation similar to Example 1 was made, but without Alitame. The formulation was halved and one half was hand sheeted with a powder blend of 1% Alitame and 99% mannitol (Example 2). The other half was hand sheeted with a powder blend of 2% Alitame and 98% mannitol (Example 3).

EXAMPLES 4 AND 5

Another gum formulation similar to Example 1 was made, but without Alitame. The formulation was halved and one half was hand sheeted with a powder blend of 1% Alitame and 99% tapioca starch (Example 4). The other half was hand sheeted with a powder blend of 0.4% Alitame and 99.6% tapioca starch (Example 5).

EXAMPLES 6 AND 7

Another gum formulation similar to Example 1 was made, but without Alitame. The formulation was halved and one half was hand sheeted with a powder blend of 1% Alitame and 99% talc (Example 6). The other half was hand sheeted with a powder blend of 0.4% Alitame and 99.6% talc (Example 7).

Each of the examples was cut into sticks. The sticks from each example were divided between six sealed pouches and stored at 85° F. Immediately a pouch was opened, several of the sticks homogenized, and the composition was analyzed for "Day Zero" percent Alitame by weight of the gum. Thereafter, a pouch was opened at the end of each of 1, 2, 4, 6 and 8 weeks and its contents similarly analyzed for percent Alitame remaining. The percent of Alitame remaining compared to the "Day Zero" amount for that sample was then calculated. The results are shown in Table II. The results for Example 1 and average results for Examples 2 and 3, 4 and 5, and 6 and 7 are shown graphically in FIG. 1.

TABLE II

Alitame Degradation in Chewing Gum

| | Day Zero Amount | Percent of Day Zero Amount of Alitame Remaining at Week | | | | |
|---|---|---|---|---|---|---|
| | | 1 | 2 | 4 | 6 | 8 |
| Example 1 (Control) | 0.030 | 90.0 | 70.0 | 66.6 | 43.3 | 33.3 |
| Example 2 (1% in mannitol) | 0.013 | 92.3 | 84.6 | 84.6 | 69.2 | 46.1 |
| Example 3 (2% in mannitol) | 0.017 | 100.0 | 88.2 | 76.5 | 70.6 | 58.8 |
| Example 4 (1% in starch) | 0.026 | 76.9 | — | 80.8 | 84.6 | 111.5 |
| Example 5 (0.4% in starch) | 0.009 | 88.9 | — | 77.8 | 55.6 | 77.8 |
| Example 6 (1% in talc) | 0.021 | 85.7 | — | 90.5 | 104.8 | 52.4 |
| Example 7 (0.4% in talc) | 0.007 | 100.0 | — | 71.4 | 85.7 | 71.4 |

Even though the data points from Table II show some fluctuation, apparently caused by experimental error during hand sheeting of the examples and random errors that were relatively large when detecting the small amounts of Alitame in the homogenized gum masses, the general trends of the data points for the different types of rolling compound ingredients shown in FIG. 1 indicates that placing the Alitame in a rolling compound produced more stability than placing it in the gum, even when mannitol was used in the rolling compound. It is theorized that Alitame degrades faster when it is incorporated in the gum because the moisture in the gum facilitates molecular movement necessary for the chemical reactions which degrade the Alitame.

FIG. 1 also shows that the Alitame stability can be further improved if the rolling compound uses starch and talc instead of mannitol, with starch being the most preferred major component of the rolling compound. Similar results are expected from other rolling compounds that are substantially free of alditols.

Of course, it should be understood that a wide range of changes and modifications can be made to the preferred embodiment and examples described above. For example, the Alitame in the rolling compound could be encapsulated or coated to further enhance its stability or delay its release, as taught in U.S. Pat. No. 4,997,659. It is therefore intended that the foregoing detailed description be regarded as illustrative rather than limiting, and that it be understood that it is the following claims, including all equivalents, which are intended to define the scope of this invention.

We claim:

1. A chewing gum product comprising:
   a) a gum composition comprising about 5% to about 95% of a gum base; about 10% to about 90% of a bulking agent and about 0.1% to about 10% of a flavoring agent; wherein at least one of said gum base ingredients, bulking agents or flavoring agents is an Alitame degradation agent; and
   b) a rolling compound on the surface of the composition, the rolling compound comprising from about 0.01% to about 20% Alitame.

2. The product of claim 1 wherein the rolling compound is substantially free of alditols.

3. The product of claim 1 wherein the rolling compound consists essentially of about 0.01% to about 20% Alitame and about 80% to about 99.99% of one or more ingredients selected from the group consisting of starch, talc, sugar, calcium carbonate and cellulose powder.

4. The product of claim 1 wherein the rolling compound comprises from about 0.25% to about 10% of the total product.

5. The product of claim 1 wherein the rolling compound comprises from about 1% to about 3% of the product.

6. The product of claim 1 wherein the Alitame in the rolling compound constitutes from about 1 ppm to about 2000 ppm of the product.

7. The product of claim 1 wherein the composition is formulated and the rolling compound is applied such that at least 60% of the original amount of Alitame remains after 8 weeks of storage at 85° F.

8. The product of claim 1 wherein the chewing gum composition is a sugarless chewing gum.

9. The product of claim 1 wherein the rolling compound comprises about 0.4% to about 1% Alitame and about 99% to about 99.6% starch.

10. A method of making a chewing gum with Alitame comprising the steps of:
    a) formulating a chewing gum composition comprising from about 5% to about 95% gum base, about 10% to about 90% of a bulking agent and about 0.1% to about 10% of a flavoring agent, wherein at least one of said gum base ingredients, bulking agents or flavoring agents is an Alitame degradation agent;
    b) providing a rolling compound comprising from about 0.01% to about 20% Alitame; and
    c) applying the rolling compound to the surface of the gum composition to make a gum product.

11. The method of claim 10 wherein the rolling compound is substantially free of alditols.

12. The method of claim 10 wherein the rolling compound consists essentially of about 0.01% to about 20% Alitame and about 80% to about 99.99% of one or more ingredients selected from the group consisting of starch, talc, sugar, calcium carbonate and cellulose powder.

13. The method of claim 10 wherein the rolling compound is applied so as to constitute from about 0.25% to about 10% of the product.

14. The method of claim 10 wherein the rolling compound is applied so as to constitute from about 1% to about 3% of the product.

15. The method of claim 10 wherein the rolling compound is applied so that t Alitame in the rolling compound constitutes from about 1 ppm to about 2000 ppm of the product.

16. The method of claim 10 wherein the composition is formulated and the rolling compound is applied such that at least 60% of the original amount of Alitame in the product remains after 8 weeks of storage at 85° F.

17. The method of claim 10 wherein the gum composition is a sugarless gum composition.

18. The method of claim 10 wherein the rolling compound comprises about 0.4% to about 1% Alitame and about 99% to about 99.6% starch.

19. A sugarless chewing gum product comprising:
   a) a gum composition comprising from about 5% to about 95% gum base, about 10% to about 90% of a sugarless bulking agent and about 0.1% to about 10% of a flavoring agent; and
   b) a rolling compound on the surface of the composition, the rolling compound comprising from about 0.01% to about 20% Alitame and being substantially free of alditols.

* * * * *

UNITED STATES PATENT AND TRADEMARK OFFICE
CERTIFICATE OF CORRECTION

PATENT NO. : 5,094,858
DATED : March 10, 1992
INVENTOR(S) : Robert J. Yatka et al.

It is certified that error appears in the above-indentified patent and that said Letters Patent is hereby corrected as shown below:

Column 1, line 20, after "of" please delete "(".

Column 5, line 40, please delete "TESTS 1-6" and substitute therefor --TESTS 1-5--.

Column 6, line 6, please delete "alitame" and substitute therefor --Alitame--.

Column 8:
Claim 15, line 2, after "that" please delete "t" and substitute therefor --the--.

Signed and Sealed this

Twelfth Day of July, 1994

Attest:

BRUCE LEHMAN

Attesting Officer

Commissioner of Patents and Trademarks